No. 875,474.  
PATENTED DEC. 31, 1907.  
J. W. WANDELL.  
HARROW.  
APPLICATION FILED SEPT. 17, 1906.

2 SHEETS—SHEET 1.

Witnesses  
Edwin G. McKee  
C. C. Hines

Inventor  
James W. Wandell  
By Victor J. Evans  
Attorney

No. 875,474. PATENTED DEC. 31, 1907.
J. W. WANDELL.
HARROW.
APPLICATION FILED SEPT. 17, 1906.

2 SHEETS—SHEET 2.

*Fig. 4.* *Fig. 5.*

Witnesses
Edwin G. McKee
C. C. Hines

Inventor
James W. Wandell
By Victor J. Evans
Attorney

UNITED STATES PATENT OFFICE.

JAMES W. WANDELL, OF PHILADELPHIA, PENNSYLVANIA.

HARROW.

No. 875,474.      Specification of Letters Patent.      Patented Dec. 31, 1907.

Application filed September 17, 1906. Serial No. 334,839.

*To all whom it may concern:*

Be it known that I, JAMES W. WANDELL, a citizen of the United States, residing at Philadelphia, in the county of Philadelphia and State of Pennsylvania, have invented new and useful Improvements in Harrows, of which the following is a specification.

This invention relates to disk plows or harrows, the object of the invention being to provide a simple, strong and durable construction of machine provided with cutting wheels or disks arranged to both cut and give a lateral stirring motion to the soil, so as to effect a thorough pulverization thereof.

Another object is to provide pulverizing devices of this character driven positively by motor mechanism on the frame, which pulverizing devices are permitted to have vertical play or movement to adapt them to freely pass over obstructions without injury.

A still further object is to provide cutting wheels or disks having removable teeth, whereby those teeth which are injured or broken or become dull may be conveniently detached and others substituted therefor and the invention consists in the construction and arrangement of parts, as will be hereinafter described and particularly pointed out in the claims.

Figure 1:
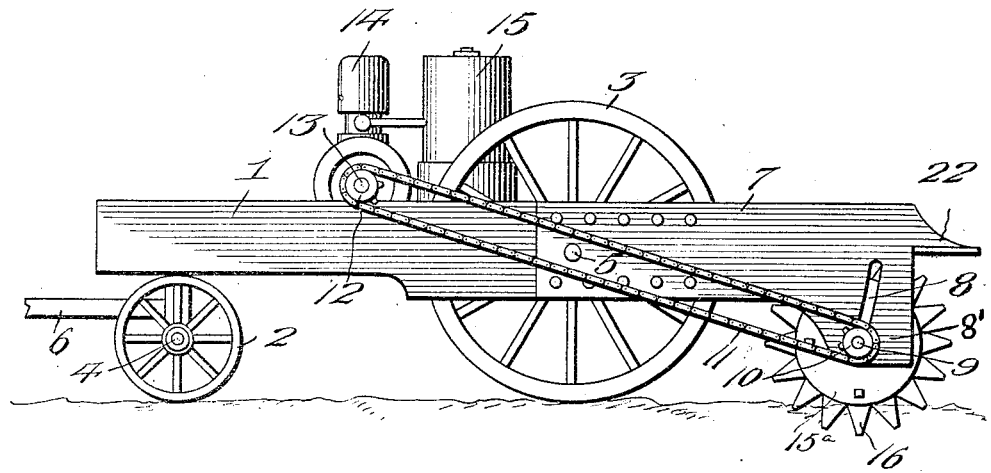
Figure 2:
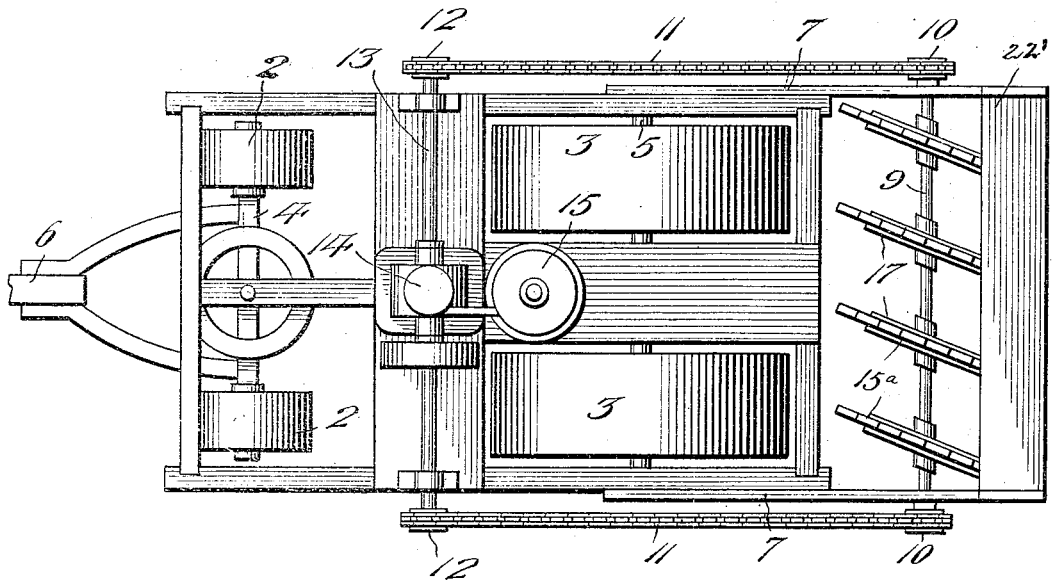
Figure 3:
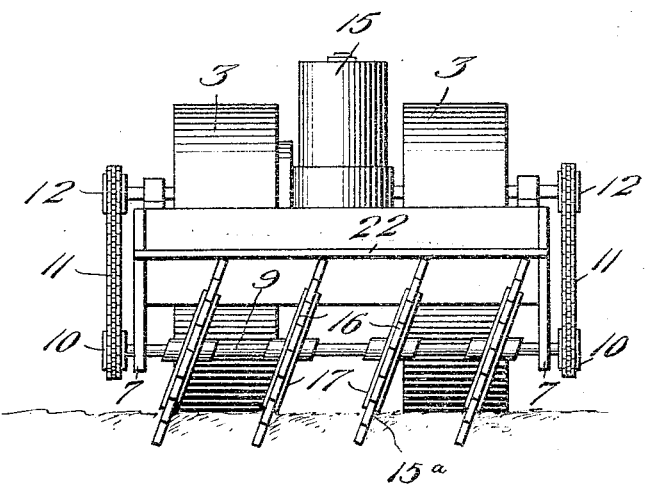
Figure 3:
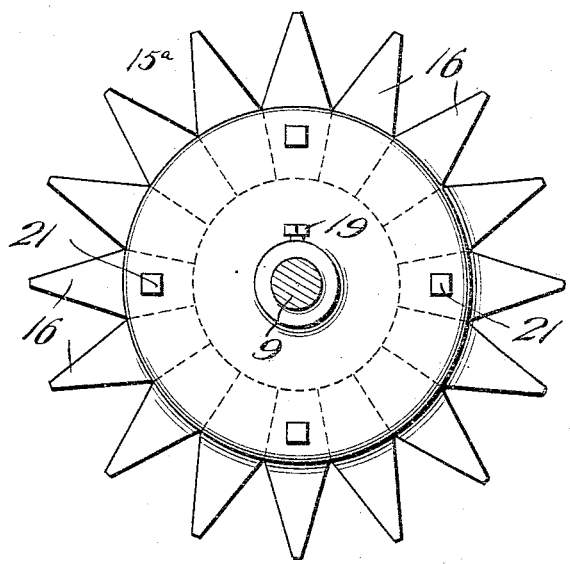
Figure 3:
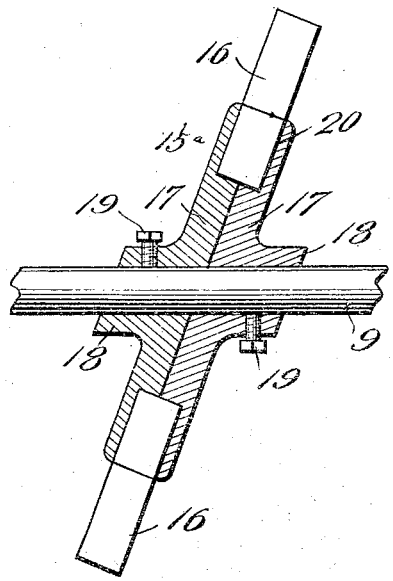

In the accompanying drawings Figure 1 is a side elevation of a disk plow or harrow embodying my invention; Fig. 2 is a top plan view of the same; Fig. 3 is a rear end elevation of the implement; Fig. 4 is a side view of one of the cutting wheels or disks; and Fig. 5 is a transverse section thereof.

Referring to the drawings, 1 designates the frame of the implement which may be of any preferred form and construction. The frame is mounted upon front and rear sets of supporting wheels or rollers 2 and 3, mounted respectively on front and rear axles 4 and 5. A tongue or other draft device 6 may be connected with the front axle so that the implement may be drawn by animal power, and the front axle has the usual fifth-wheel connection with the frame to allow the implement to be conveniently steered.

The frame is provided with rearwardly extending bracket plates 7 provided with arcuate bearing slots 8 in which are journaled the ends of a transverse shaft 9, carrying at each end a sprocket wheel 10. The wheels 10 are connected by chains 11 with corresponding wheels 12 on a transverse motor shaft 13 journaled in bearings on the front portion of the frame. Shaft 13 may be driven by an preferred type of hydrocarbon motor 14 mounted upon the frame and supplied with hydrocarbon from a tank or reservoir 15. The operation of the motor drives the shaft 13 which, through the gearing just described, transfers motion to the rear transverse shaft 9.

On the shaft 9 are cutting disks or wheels 15ª provided with cutting teeth 16. These disks are arranged at an oblique angle on the shaft, and are fixed thereto to revolve therewith so that as the shaft turns the wheels will be given a rotary motion in the direction of revolution as well as a lateral or sidewise motion, thus causing them in effect to wabble as they rotate. By this means the disks, in addition to cutting into the soil also serve to loosen and stir the same, thus pulverizing the soil to a fine condition.

Each cutting wheel or disk comprises a hub formed of a pair of clamping plates 17 having coinciding sleeves 18 bored at an angle for the passage of the shaft 9 and provided with clamping screws 19 to fasten the same thereto. The meeting faces of the hub plates are recessed to form an annular receiving socket 20 to receive the set of cutting teeth 16, which latter have tapered shanks to fit within said socket and are clamped in position by screws or bolts 21 passing through the plates. By this construction any one of the teeth 16 may be readily removed when broken or injured and a new cutting tooth substituted therefor.

The mode of use of the implement will be readily understood from the foregoing description, and it will be apparent that the invention provides a simple and efficient type of cutting mechanism to plow or harrow the soil.

I wish it to be understood that the rear ends of the brackets are cut-away in right angular shape to provide downwardly extensions 8', in which and said brackets the arcuate slots are formed. Further, the cut-away portions also form portions 22, to which is secured a transverse shield or hood 22', said shield being arranged over the rear portions of the disks and serve to prevent the soil from flying upward above the same.

If desired, the motor may be geared with either the front or rear wheels of the vehicle, so that it may be used to drive the vehicle as well as the cutting mechanism. Planting and fertilizing devices may be arranged upon the vehicle, so that the operation of fertilizing and harrowing the soil and planting seed of any desired kind may be simultaneously performed.

Having thus described the invention, what I claim is:

A plow or harrow comprising a wheeled supporting frame, plates projecting rearwardly and secured to the opposite sides of the frame, said plates being cut-away at their rear portions in right angular form to provide downward extensions and rearwardly projecting portions, said extensions and plates being provided with arcuate slots, an axle mounted in said slots and having angular disks thereon, means for rotating said shaft, and a transverse shield secured to said rearwardly projecting portions, substantially as described.

In testimony whereof I affix my signature in presence of two witnesses.

JAMES W. WANDELL.

Witnesses:
WM. S. WATSON,
JOS. N. BEVISOL.